United States Patent Office 2,769,746
Patented Nov. 6, 1956

2,769,746

MONO-HYDROXYCYCLOALKANE AND ORTHO BORIC ACID MIXTURE OINTMENT-LIKE COMPOSITION

Margaret M. Clark, Mountain Lakes, N. J., assignor of one-half to Arthur R. Clark, Mountain Lakes, N. J.

No Drawing. Application February 29, 1952,
Serial No. 274,297

6 Claims. (Cl. 167—63)

This invention relates to new compositions of a cream or ointment-like consistency which are of value as ointments and as vehicles for medicaments to be applied to the skin. This application is a continuation-in-part of my prior application Serial No. 122,589, filed October 20, 1949, now Patent No. 2,613,219, granted October 7, 1952.

The new compositions of the invention contain, as essential ingredients—

(1) A mono-hydroxycycloalkane containing 4 to 10 carbon atoms, including cyclobutanol, cyclopentanol, 1-methyl-cyclopentanol-1, cyclohexanol, 1-methyl-cyclohexanol-1, -2 or -3, 1,3-dimethyl-cyclohexanol-1 and the corresponding ethyl or propyl derivatives with the total number of carbons not exceeding 10;

(2) Boric acid;

(3) Water—which may be present in very small amounts; and (4) A stabilizer, such as one of the water-swellable bentonites, or a gelatinous colloid such as algin, pectin, carboxy methyl cellulose, or the like.

As optional ingredients the compositions may include any of a wide range of medicaments intended for application to the skin, for example, a fungicide such as copper 8-quinolinolate, a sulfa drug, tannic acid, or the like.

The new compositions of the invention have the property, unique so far as I know, of existing as stable creams or ointments which on application to the skin in relatively thin films, turn to powder, which may be removed almost entirely by a simple brushing. They thus have the advantage, particularly in the veterinary field, as compared with ointments, creams or lotions commonly used, of not matting the hair or forming a relatively impervious layer which excludes air from the underlying portions of the skin.

The new compositions contain the mono-hydroxycycloalkane, in proportions based on total vehicle composition—excluding added medicament—in amounts ranging from about 25 to about 55%, the boric (ortho boric) acid in amounts ranging from about 10 to about 45%, the stabilizer, if it is a water-swellable bentonite or its equivalent, i. e., other water-swellable clay, in amount ranging from 1 to about 6%, and if it is a gelatinous colloid, for example, algin, pectin or carboxy methyl cellulose, about 1%, and water q. s. 100%.

I have not yet been able to compound a product having desirable pharmaceutical properties, or the required stability, using the mono-hydroxycycloalkane and ortho boric acid as such. It may be that products fully equivalent to mine can be prepared using these materials but my attempts using them have been unsuccessful.

I have found that by combining the mono-hydroxycycloalkane with boric acid to form an ester of the mono-hydroxycycloalkane with a molecularly dehydrated boric acid, as compared with ortho boric acid, as described in my said application Serial No. 122,589, I obtain a product which, on admixture with water and a stabilizing agent, in proper proportions as outlined above, gives a stable, useful cream of desirable consistency, and which has the capacity when applied to the skin of changing within a short period of time to a dry powder. A substantially equivalent product may be prepared by compounding together the mono-hydroxycycloalkane, molecularly dehydrated boric acid, specifically meta boric acid, water and the stabilizer. Where the ester of the molecularly dehydrated boric acid and the mono-hydroxycycloalkane is used, the addition of the water results in hydrolysis of the ester and accompanying hydration, with evolution of some heat, with regeneration of the free mono-hydroxycycloalkane and formation of a corresponding amount of ortho boric acid. Where meta boric acid is used, it hydrates when admixed with the water to form ortho boric acid, so that the chemical composition of the final product is the same as though the materials compounded together were mono-hydroxycycloalkane, ortho boric acid and whatever additional ingredients are included.

Advantageously, the boric acid and the mono-hydroxycycloalkane are used in substantially equi-molecular proportions, i. e., one mole of alcohol to one mole of boric acid, but useful products are obtained even with considerable variations from these proportions. For example, if it is desirable to have the vehicle one which becomes converted relatively slowly to a powder after application, the mono-hydroxycycloalkane should be used in substantial excess, based on molecular proportions, as compared with the boric acid, for example, up to two moles of the mono-hydroxycycloalkane to one of the boric acid. Thus, if the mono-hydroxycycloalkane selected is cyclohexanol, which I have found particularly advantageous, the weight proportions of the cyclohexanol and ortho boric acid in the final product are advantageously in the ratio of about 5:3. If the boric acid is introduced as the meta borate, $HBO_2$, the relative weight proportions of the cyclohexanol and the meta boric acid are advantageously about 100:44. But, as I have pointed out, the relative proportions may be widely varied from these figures, for example, calculated in terms of the cyclohexanol and ortho boric acid finally present, from about 100:70 to about 100:25. I have found particularly advantageous products may be prepared, again using cyclohexanol, with the use of a weight ratio of cyclohexanol to meta boric acid of 61:39.

I have also found that when a water-swellable bentonite is used as the stabilizer it is sometimes advantageous to incorporate in the product a small amount of an additional stabilizer or colloidal substance such as up to about 20%, based on the bentonite, of a material such as methyl vinyl ether-maleic anhydride copolymer, commercially available under the designation PVM, algin, pectin or the like. Small quantities of PVM impart lubricating properties to the product without, in these small proportions, materially interfering with the powderizing tendency.

The invention will be illustrated by the following specific examples, but it is not limited thereto.

*Example I*

The meta borate of cyclohexanol is made as follows: 1 mole of ortho boric acid $H_3BO_3$ is mixed with 1.67 moles of cyclohexanol. The resulting mixture is refluxed at its boiling point which will be about 162° or somewhat higher as the reaction progresses. Water is removed from the vapors by granules of calcium chloride. The refluxing is continued until the amount of moisture removed corresponds to 1 molecule of water formed in the esterification and also 1 molecule of water formed by dehydration of the original boric acid to the meta or $HBO_2$ stage. Whether the dehydration of the boric acid occurs entirely after or before the formation of the initial ester is not material.

The product formed, after cooling and evaporation of cyclohexanol, had a weight 2.17 times the weight of boric acid used, as compared with approximately 2.05 theory for the meta borate. Some of the excess of cyclohexanol remained in amount to account for this slight excess of actual weight over the theoretical.

The ester is a glossy, slightly yellow crystalline solid that decomposes when heated or when exposed to moisture. In contact with air that has not been dehumidified, the product quickly liquefies.

69 parts of this ester were admixed with 4 parts of water-swellable bentonite (2 parts of HV Veegum and 2 parts of Volclay), 1 part of copper 8-quinolinolate and 26 parts of water, yielding a stable emulsion, of the water-in-oil type, of value for the treatment of fungus infections of the skin of animals. On application to an infected area, the product within a short time turns to a dry powder which does not mat the hair of the animal.

*Example II*

Ortho boric acid is converted to meta boric acid by heating to 110° C. until no more loss in weight occurs. The resulting meta boric acid is mixed with dry water-swellable clay, to the resulting product is added the cyclohexanol, and then the water is added with stirring and the product milled, after the addition of medicament, if one is used.

In the series of products prepared using cyclohexanol and meta boric acid in weight ratio of 61:39, with the use of 2 parts of HV Veegum, 2 parts of Volclay and 1 part of copper 8-quinolinolate, stable products of the oil-in-water type were obtained using 20 to about 45 parts of the cyclohexanol and meta boric acid, and water q. s. 100, while stable products of the water-in-oil type were obtained using amounts of cyclohexanol and meta boric acid ranging from about 65 to about 95 parts and water q. s. 100. Some of these preparations, in the upper limit of the range of cyclohexanol and meta boric acid, contained no water or insufficient water to hydrate all of the meta boric acid and were therefore unsatisfactory. The most desirable products were found in the range of about 80 to about 87 parts of the cyclohexanol and meta boric acid and about 15 to about 8 parts of water. These products are easily milled. Higher proportions of the cyclohexanol and meta boric acid give products which set up within a short period of time and become too hard. Lower proportions give satisfactory products which are difficult to mill. A discontinuity was noted where the amount of cyclohexanol and meta boric acid ranged from about 45 to about 64 parts and the amount of water from about 50 to about 29 parts, as the products formed in this area lacked stability, that is, the emulsions tended to break.

*Example III*

The procedure followed is the same as that of Example I except that instead of using cyclohexanol, any one of the other mono-hydroxycycloalkanes listed above is substituted therefor mole for mole. The initial esters are solid materials which are subject to decomposition in contact with moisture, and are used for preparing creams following the procedure described in Example I, with hydrolysis of the esters, regeneration of the mono-hydroxycycloalkane and formation of ortho boric acid by hydration.

*Example IV*

The procedure of Example I is followed except that 5 parts of tannic acid are substituted for the one part of copper 8-quinolinolate.

Replacement of the 5 parts of tannic acid by 5 parts of sulfadiazine yields a useful cream.

A cream made in accordance with either Example I or Example II but without incorporation therein of any added medicament, i. e., omitting the copper 8-hydroxy quinolinolate, is useful.

I claim:

1. A new composition of matter, which composition is an intimate admixture of about 25 to 55 parts of a mono-hydroxycycloalkane having 4 to 10 carbon atoms, ortho boric acid in amount ranging from about 50 to about 112 mole per cent based on the mono-hydroxycycloalkane, about 1 to about 6 parts of a suspension stabilizing agent and water q. s. 100.

2. A new composition of matter as in claim 1 in which the stabilizer is a water-swellable clay.

3. A new composition of matter as in claim 1 in which the mono-hydroxycycloalkane is cyclohexanol.

4. A new composition of matter as in claim 1 in which the mono-hydroxycycloalkane is cyclohexanol and the stabilizing agent is a water-swellable clay.

5. A new composition of matter as in claim 1 which in addition contains a small amount of a medicament for application to skin.

6. A new composition of matter as in claim 1 in which the suspension stabilizing agent is a gelatinous colloid.

References Cited in the file of this patent

UNITED STATES PATENTS

| | | |
|---|---|---|
| 1,813,109 | Banks | July 7, 1931 |
| 2,053,474 | Graves | Sept. 8, 1936 |
| 2,613,219 | Clark | Oct. 7, 1952 |

OTHER REFERENCES

Goodman: Cosmetic Dermatology (1936), pages 130, 131.

Wuyts: Chemical Abstracts, vol. 33, pages 7274, 7275 (1939).

Lesser: Drug and Cosmetic Industry, vol. 49, October 1941, pages 390 to 393.

Schwartz: Cosmetics and Dermatitis (1946), page 47.

Schwartz: Occupational Diseases of the Skin (1947), page 924.

Treon: J. Industrial Hygiene, vol. 25 (1943), pages 206 to 208, 211 to 214.

Grandel: Chemical Abstracts, vol. 37, page 479 (1943).

Lesser: Drug and Cosmetic Industry, vol. 49, October 1941, pages 390, 391, 392, 393.